US011188393B1

United States Patent
Li

(10) Patent No.: US 11,188,393 B1
(45) Date of Patent: Nov. 30, 2021

(54) SYSTEMS AND METHODS FOR PERFORMING LOAD BALANCING AND DISTRIBUTED HIGH-AVAILABILITY

(71) Applicant: NORTONLIFELOCK INC., Tempe, AZ (US)

(72) Inventor: Qing Li, Cupertino, CA (US)

(73) Assignee: NortonLifeLock Inc., Tempe, AZ (US)

( * ) Notice: Subject to any disclaimer, the term of this patent is extended or adjusted under 35 U.S.C. 154(b) by 0 days.

(21) Appl. No.: 17/190,219

(22) Filed: Mar. 2, 2021

(51) Int. Cl.
*G06F 9/46* (2006.01)
*G06F 9/50* (2006.01)
*G06F 11/07* (2006.01)
*G06F 11/34* (2006.01)
*G06F 11/30* (2006.01)
*G06F 9/30* (2018.01)

(52) U.S. Cl.
CPC ........ *G06F 9/5083* (2013.01); *G06F 9/30087* (2013.01); *G06F 9/466* (2013.01); *G06F 9/505* (2013.01); *G06F 11/076* (2013.01); *G06F 11/0772* (2013.01); *G06F 11/3075* (2013.01); *G06F 11/3433* (2013.01)

(58) Field of Classification Search
CPC ..... G06F 9/5083; G06F 9/30087; G06F 9/466
See application file for complete search history.

(56) References Cited

U.S. PATENT DOCUMENTS

| 4,390,946 A * | 6/1983 | Lane ................ G06F 9/28 365/230.02 |
| 6,826,598 B1 * | 11/2004 | Titmuss ............. G08G 1/0962 709/212 |
| 6,938,039 B1 * | 8/2005 | Bober ................ G06F 16/119 707/704 |
| 9,037,826 B1 * | 5/2015 | Brooker ............ H04L 43/08 711/167 |
| 9,148,479 B1 * | 9/2015 | Bhalerao ............ H04L 67/34 |
| 9,519,902 B2 * | 12/2016 | Amancherla ...... G06Q 20/4016 |
| 2013/0117417 A1 * | 5/2013 | Chen ................ H04L 41/0896 709/219 |
| 2018/0144828 A1 * | 5/2018 | Baker ................ G16H 15/00 |

* cited by examiner

*Primary Examiner* — Camquy Truong
(74) *Attorney, Agent, or Firm* — FisherBroyles, LLP

(57) ABSTRACT

The disclosed computer-implemented method for performing load balancing and distributed high-availability may include (i) detecting through a group communication channel that links all nodes of a computing cluster that an overburdened node of the computing cluster has fallen below a predefined performance level, (ii) determining to transfer a specific microservice transaction from the overburdened node to a helper node in the computing cluster, (iii) copying data for the specific microservice transaction from a portion of a central data store that is reserved for the overburdened node to another data store that is reserved for the helper node, and (iv) completing, by the helper node, the specific microservice transaction by referencing the copied data for the specific microservice transaction in the data store that is reserved for the helper node. Various other methods, systems, and computer-readable media are also disclosed.

20 Claims, 9 Drawing Sheets

SYSTEMS AND METHODS FOR PERFORMING LOAD BALANCING AND DISTRIBUTED HIGH-AVAILABILITY

BACKGROUND

Organizations may leverage computing clusters to perform microservice tasks associated with applications. For example, a particular node within a computing cluster may be assigned one or more specific microservice tasks. Nevertheless, the particular node may become overburdened for a variety of reasons. In some examples, the particular node may inadvertently take on more microservice tasks than can be handled by its available resources. In other examples, the particular node may experience a catastrophic failure. In these scenarios, the fact that the particular node has become overburdened creates problems and inefficiencies when trying to complete the specific microservice tasks. The present disclosure, therefore, identifies and addresses a need for systems and methods for performing load balancing and distributed high-availability.

SUMMARY

As will be described in greater detail below, the present disclosure describes various systems and methods for performing load balancing and distributed high-availability. In one example, a computer-implemented method for performing load balancing may include (i) detecting through a group communication channel that links all nodes of a computing cluster that an overburdened node of the computing cluster has fallen below a predefined performance level, (ii) determining to transfer a specific microservice transaction from the overburdened node to a helper node in the computing cluster, (iii) copying data for the specific microservice transaction from a portion of a central data store that is reserved for the overburdened node to another data store that is reserved for the helper node, and (iv) completing, by the helper node, the specific microservice transaction by referencing the copied data for the specific microservice transaction in the data store that is reserved for the helper node.

In one embodiment, the central data store holds all transactions from all nodes of the computing cluster. In one embodiment, the central data store may include a high-availability central data store that satisfies a predefined high-availability threshold according to a metric that measures availability of the central data store.

In one embodiment, each node within a set of nodes of the computing cluster synchronizes or deposits its microservice transactions between a respective local storage and the central data store. In one embodiment, the central data store is configured such that each node within a set of nodes has its own allocation such that a synchronization procedure for synchronizing input/output data for one node does not disturb input/output data for any other nodes within the set of nodes. In one embodiment, the central data store creates an efficiency advantage for synchronization procedures such that a node may synchronize input/output data with the central data store rather than transmitting multiple copies of the input/output data to multiple other nodes.

In one embodiment, the group communication channel may include a multicast channel. In some examples, detecting through the group communication channel that links all nodes of the computing cluster that the overburdened node of the computing cluster has fallen below the predefined performance level may include detecting that the overburdened node has failed to transmit a number of periodic heartbeat messages. In some examples, detecting that the overburdened node has failed to transmit the number of periodic heartbeat messages may include triggering a determination that the overburdened node has experienced a catastrophic failure.

In one embodiment, the catastrophic failure triggers a remaining set of nodes of the computing cluster to each evaluate, based on an analysis of a respective current resource consumption level, whether to take ownership of at least one microservice transaction that previously belonged to the overburdened node. In one embodiment, the respective current resource consumption level refers to at least one of available CPU cycles or runtime memory. In some examples, detecting through the group communication channel that links all nodes of the computing cluster that the overburdened node of the computing cluster has fallen below the predefined performance level may include receiving a help message that indicates that the overburdened node is seeking assistance from another node.

In one embodiment, the overburdened node creates an index of specific microservice transactions with which the overburdened node seeks assistance from another node. In one embodiment, another node takes over a microservice transaction from the overburdened node based on an analysis of the index of specific microservice transactions.

In one embodiment, all of the specific microservice transactions held by the overburdened node are placed on an index of specific microservice transactions with which the overburdened node seeks assistance from another node due to a determination that the overburdened node has experienced a catastrophic failure. In one embodiment, the overburdened node recovers from the catastrophic failure and then synchronizes and resumes specific microservice transactions on the index that have not been previously claimed by other nodes within the computing cluster.

In one embodiment, each node within a set of nodes in the computing cluster executes a uniform basic set of algorithms to compute viability for volunteering its computing resources to assist another node. In one embodiment, each node within the set of nodes, in addition to executing the uniform basic set of algorithms, furthermore executes local algorithms to estimate viability of lending computing resources based on underlying variations in load levels or other conditions at each node.

In one embodiment, a system for implementing the above-described method may include (i) a detection module, stored in memory, that detects through a group communication channel that links all nodes of a computing cluster that an overburdened node of the computing cluster has fallen below a predefined performance level, (ii) a determination module, stored in memory, that determines to transfer a specific microservice transaction from the overburdened node to a helper node in the computing cluster, (iii) a copying module, stored in memory, that copies data for the specific microservice transaction from a portion of a central data store that is reserved for the overburdened node to another data store that is reserved for the helper node, (iv) a completion module, stored in memory, that completes, by the helper node, the specific microservice transaction by referencing the copied data for the specific microservice transaction in the data store that is reserved for the helper node, and (v) at least one physical processor configured to execute the detection module, the determination module, the copying module, and the completion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect through a group communication channel that links all nodes of a computing cluster that an overburdened node of the computing cluster has fallen below a predefined performance level, (ii) determine to transfer a specific microservice transaction from the overburdened node to a helper node in the computing cluster, (iii) copy data for the specific microservice transaction from a portion of a central data store that is reserved for the overburdened node to another data store that is reserved for the helper node, and (iv) complete, by the helper node, the specific microservice transaction by referencing the copied data for the specific microservice transaction in the data store that is reserved for the helper node.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
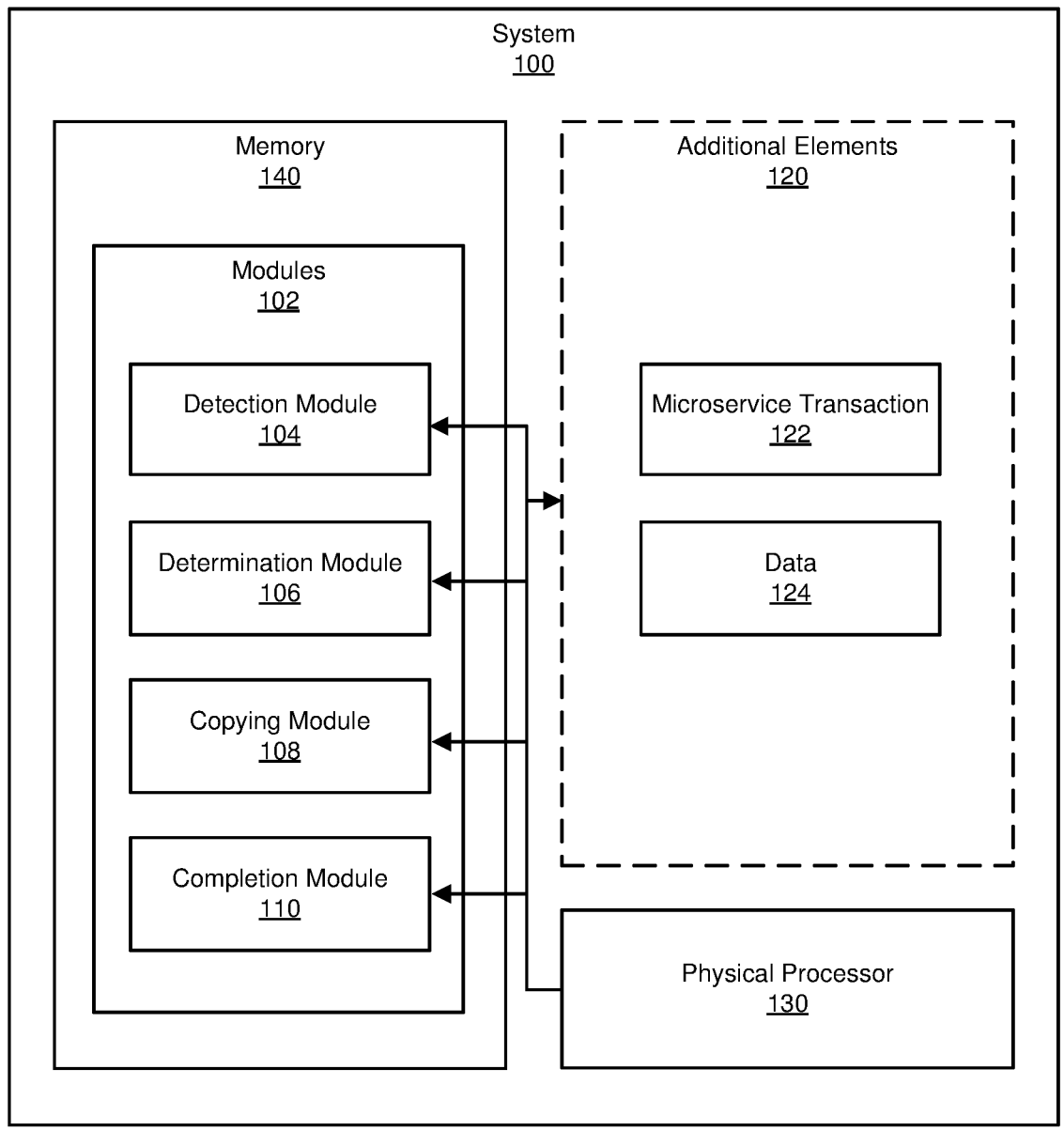
FIG. 1 is a block diagram of an example system for performing load balancing and distributed high-availability.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for performing load balancing and distributed high-availability. The disclosed technology may reference a central data store in a manner that eliminates the need for one node to send multiple copies of input/output data to multiple other nodes. The disclosed technology may also allow nodes within a computing cluster to execute both a uniform set of algorithms and also a varying set of algorithms in evaluating whether to take over one or more microservice transactions from an overburdened node. Furthermore, the disclosed technology may allow for only nodes in the computing cluster that have already agreed to take over a transaction to process details of the transaction, whereas other systems may involve all of the nodes of the computing cluster processing these details even if they decide not to take over the transaction. These improvements, as well as other improvements, are discussed more extensively below.

Figure 2:
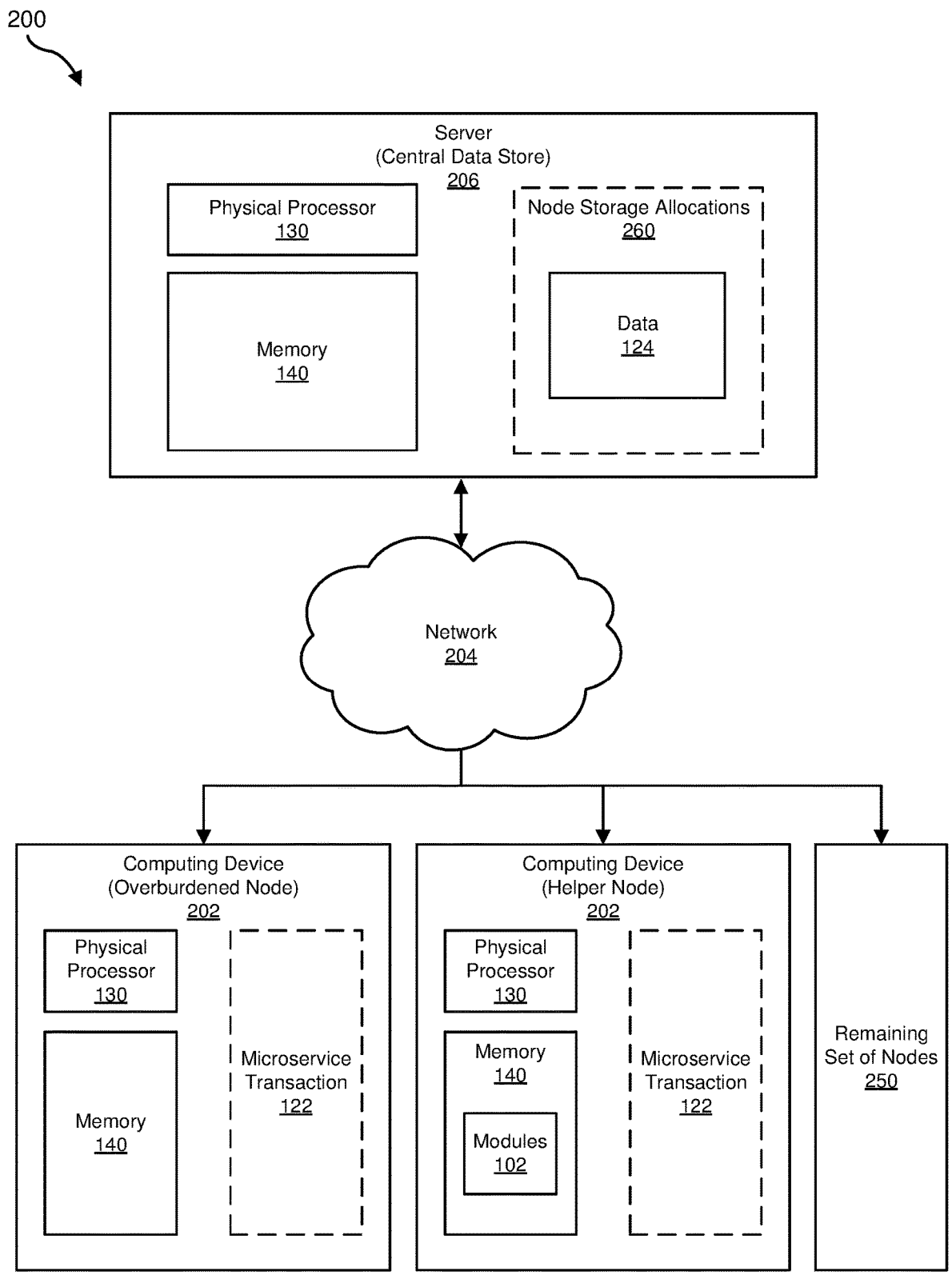
FIG. 2 is a block diagram of an additional example system for performing load balancing and distributed high-availability.

The following will provide, with reference to FIGS. 1-2, detailed descriptions of example systems for performing load balancing and distributed high-availability. Detailed descriptions of corresponding computer-implemented methods will also be provided in connection with FIGS. 3-7. In addition, detailed descriptions of an example computing system and network architecture capable of implementing one or more of the embodiments described herein will be provided in connection with FIGS. 8 and 9, respectively.

FIG. 1 is a block diagram of example system 100 for performing load balancing and distributed high-availability. As illustrated in this figure, example system 100 may include one or more modules 102 for performing one or more tasks. For example, and as will be explained in greater detail below, example system 100 may include a detection module 104 that detects through a group communication channel that links all nodes of a computing cluster that an overburdened node of the computing cluster has fallen below a predefined performance level. Example system 100 may additionally include a determination module 106 that determines to transfer a specific microservice transaction 122 from the overburdened node to a helper node in the computing cluster. Example system 100 may also include a copying module 108 that copies data 124 for the specific microservice transaction from a portion of a central data store that is reserved for the overburdened node to another data store that is reserved for the helper node. Example system 100 may additionally include a completion module 110 that completes, as part of the helper node, microservice transaction 122 by referencing the copied data 124 for the microservice transaction 122 in the data store that is reserved for the helper node. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate performing load balancing and distributed high-availability. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to perform load-balancing and distributed high-availability.

For example, and as will be described in greater detail below, detection module 104 may detect through a group communication channel that links all nodes of a computing cluster that an overburdened node (which may correspond to an instance of computing device 202 on the left-hand side) of the computing cluster has fallen below a predefined performance level. Determination module 106 may determine to transfer microservice transaction 122 from the overburdened node to a helper node (which may correspond to another instance of computing device 202 on the right-hand side) in the computing cluster. Copying module 108 may copy data for microservice transaction 122 from a portion of a central data store, within a server 206, that is reserved for the overburdened node to another data store that is reserved for the helper node (e.g., a local data store within the helper node). Completion module 110 may complete, as part of the helper node, microservice transaction 122 by referencing copied data 124 for microservice transaction 122 in the data store that is reserved for the helper node.

Figure 5:
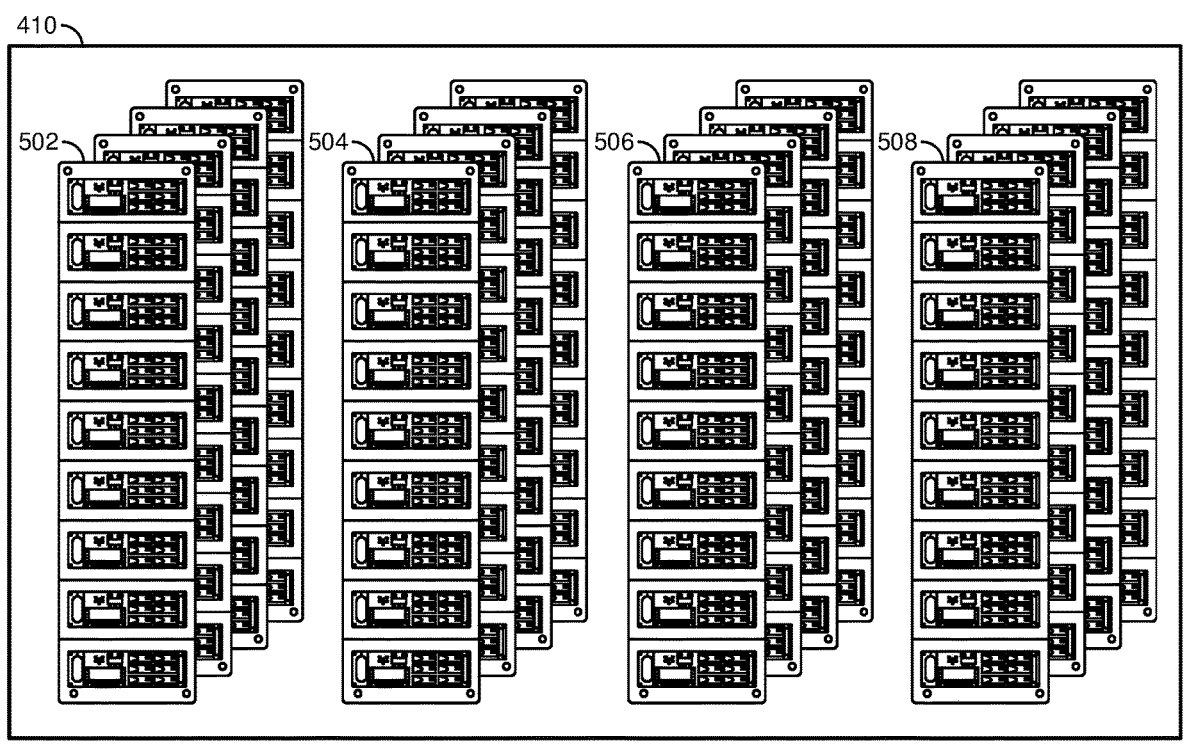
FIG. 5 is a diagram that illustrates how a high-availability central data store may allocate storage to respective nodes independently of each other.

FIG. 2 also further illustrates how server 206 may include node storage allocations 260, which are further discussed below in the context of FIG. 5, and these allocations may further store data 124. Moreover, this figure also further illustrates how the overburdened node, the helper node, and a remaining set of notes 250 may together form a computing cluster.

Computing device 202 generally represents any type or form of computing device capable of reading computer-executable instructions. Generally speaking, computing device 202 may correspond to a member node within a computing cluster, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
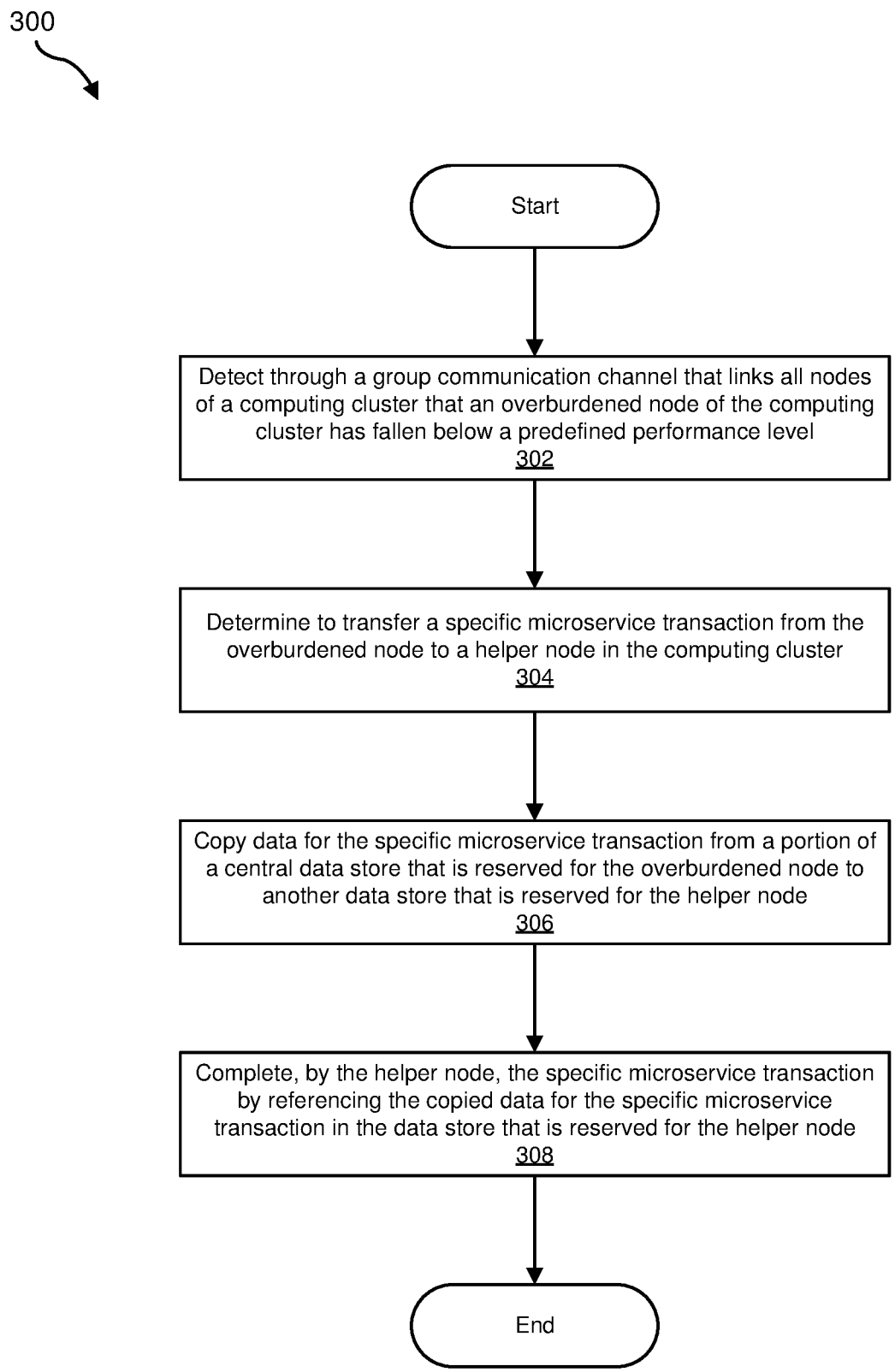
FIG. 3 is a flow diagram of an example method for performing load balancing and distributed high-availability.

FIG. 3 is a flow diagram of an example computer-implemented method 300 for performing load balancing and distributed high-availability. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect through a group communication channel that links all nodes of a computing cluster that an overburdened node of the computing cluster has fallen below a predefined performance level. For example, detection module 104 may, as part of computing device 202 in FIG. 2, detect through a group communication channel that links all nodes of a computing cluster that an overburdened node of the computing cluster has fallen below a predefined performance level. The performance level may be "predefined" in the sense that it serves as a suitable benchmark for determining whether a node has become overburdened and may, therefore, have been set in advance prior to the performance of step 302.

Detection module 104 may perform step 302 in a variety of ways. In some examples, detection module 104 may detect that a node is overburdened by either receiving a help message indicating that the node is seeking assistance or by detecting that the node has failed to transmit one or more periodic or otherwise expected heartbeat messages. Detection module 104 may detect the presence or absence of such a message across a group communication channel that is reserved for transmitting these messages. In some examples, the group communication channel may include a multicast channel that transmits one-to-many messages to multiple other nodes of the computing cluster. The multicast channel may optionally transmit the one-to-many messages simultaneously. Generally speaking, the group communication channel may be configured such that a message sent from one node may be received by another set of nodes. For example, the other set of nodes may include a remaining set of nodes 250. The remaining set of nodes may optionally include every other node within the computing cluster other than the transmitting node.

Figure 4:
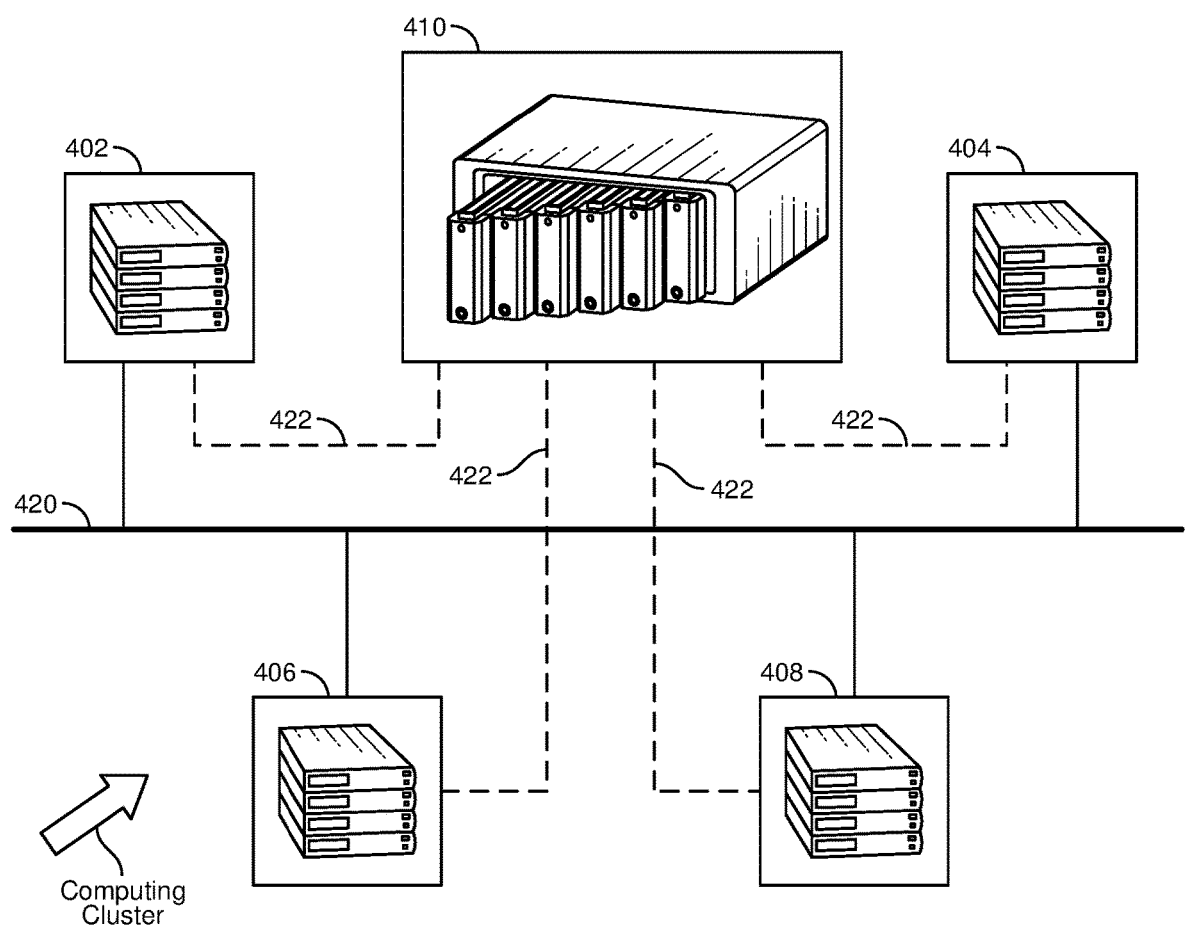
FIG. 4 is a diagram that illustrates two separate communication channels.

FIG. 4 illustrates an example of a group communication channel 420 that links together four separate nodes within a computing cluster, a node 402, a node 404, a node 406, and a node 408. Each one of these nodes may correspond to an instance of computing device 202 shown in FIG. 2. FIG. 4 also further illustrates how a high availability central data store 410, which may correspond to server 206 in FIG. 2, is also connected to the set of nodes within the computing cluster. This figure also illustrates how high availability central data store 410 may be connected to the set of nodes through respective instances of a high-bandwidth data transfer channel 422.

The high-bandwidth data transfer channel 422 may be separate and/or independent from group communication channel 420. For example, the group communication channel may ensure that a message transmitted from one node is received by multiple other nodes. In contrast, high-bandwidth data transfer channel 422 may be configured such that a message is only transmitted between a respective node and high availability central data store 410. Moreover, group communication channel 420 may be reserved for transmitting relatively lightweight heartbeat messages and/or help messages, as discussed further below. In contrast, high-bandwidth data transfer channel 422 may be reserved for transmitting a substantially greater amount of data, which may correspond to underlying data for supporting or completing microservice transactions, as discussed below. In other words, messages across high-bandwidth data transfer channel 422 may be leveraged for transmitting substantially heavier data that is used in the direct performance or completion of a microservice transaction, whereas messages across group communication channel 420 are used to transmit substantially lighter weight messages to simply coordinate which nodes of the computing cluster will actually perform or complete respective microservice transactions, rather than being used to directly or actually perform these microservice transactions.

The usage of two separate and conceptually distinct communication channels helps to eliminate scenarios whereby many different copies of the same heavier or high-bandwidth appropriate data are transmitted from one node to many other nodes, as in some other systems, because in the system of FIG. 4 the high-bandwidth data is only transmitted to or from high availability central data store 410, whereas group communication channel 420 is reserved for more lightweight heartbeat and help messages. Thus, although the heartbeat and help messages are transmitted to each computing node within a set of computing nodes, including potentially every remaining node within the computing cluster, the lightweight nature of these messages helps to avoid bandwidth problems that would be associated with transmitting the heavier or more high-bandwidth appropriate data that is stored within high availability central data store 410.

Figure 7:
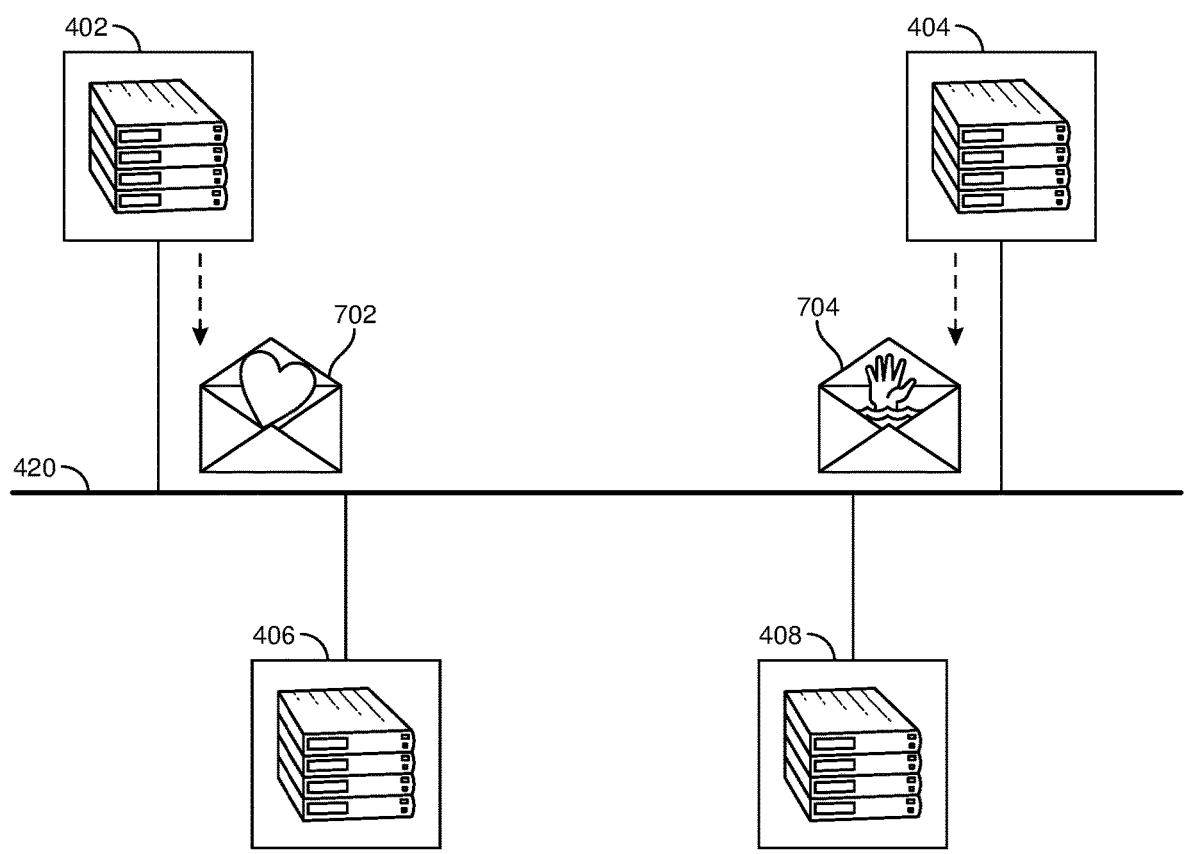
FIG. 7 is a variation of FIG. 4 that illustrates how nodes of a computing cluster may transmit heartbeat and help messages.

FIG. 7 shows a variation of FIG. 4 that further illustrates how a particular node within the computing cluster may transmit a heartbeat message 702 and/or a help message 704. These messages may be transmitted across group communication channel 420 such that each one of the remaining three nodes shown within the figure may receive a copy of the message. Generally speaking, heartbeat message 702 may simply indicate that a node is still online and functioning at least partially, even if there has been a partial failure as distinct from a catastrophic failure. Thus, the failure to detect a number of periodic or expected heartbeat messages may indicate to each one of a remaining set of nodes that the particular node has experienced a catastrophic failure. In contrast, help message 704 may indicate to other nodes within the computing cluster that the particular node is requesting assistance with at least some of the microservice transactions that the particular node is currently assigned or holding.

At step 304, one or more of the systems described herein may determine to transfer a specific microservice transaction from the overburdened node to a helper node in the computing cluster. For example, determination module 106 may, as part of computing device 202 in FIG. 2, determine to transfer microservice transaction 122 from the overburdened node to a helper node in the computing cluster. As used herein, the term "helper node" generally refers to any node of the computing cluster that helps or assists another node in accordance with the inventive concept of method 300.

As used herein, the term "microservice" generally refers to a service provided by an application with an architecture where the application is arranged as a collection of loosely coupled services. Moreover, a loosely coupled system may refer to a system in which each of its components has, or makes use of, no or substantially no knowledge of definitions of other separate components. The services may be loosely coupled according to a preestablished definition or protocol for loose coupling, as distinct from tight coupling. Moreover, in a microservices architecture, services themselves are fine-grained according to a preestablished definition or protocol for granularity. Additionally, or alternatively, in a microservices architecture, corresponding protocols are lightweight. Generally speaking, microservices may have a majority of the following features: (i) they refer to processes that communicate over a network to fulfill a goal using technology-agnostic protocols such as HTTP, (ii) they are organized around business capabilities, (iii) they can be implemented using different programming languages, databases, hardware and software environments, depending on which of these fits best, and/or (iv) they are relatively small in size, messaging-enabled, bounded by contexts, autonomously developed, independently deployable, decentralized and/or built and released with automated processes. Alternatively, microservices may be defined as having the following two corresponding features: (i) the microservices lend themselves to a continuous delivery software development process, such that a change to a small part of the application only requires rebuilding and redeploying only one or a predefined small number of services and (ii) adhere to principles of fine-grained interfaces to independently deployable services and/or business-driven development or domain-driven design. In alternative embodiments, the term microservices may be replaced with the simpler term services or application components.

Determination module 106 may perform step 304 in a variety of ways. Generally speaking, determination module 106 may perform step 304 as a part of the helper node, such as the instance of computing device 202 listed as the helper node within FIG. 2. Accordingly, the determination by the helper node to transfer the microservice transaction to itself may effectively constitute a decision by the helper node to take over the microservice transaction from the overburdened node. The helper node may determine to take over the microservice transaction at least in part by executing a uniform basic set of algorithms to compute viability for volunteering its computing resources to assist another node. The set of algorithms may be uniform or basic in the sense that each node within a set of nodes, such as every remaining node within the computing cluster, may execute the same set such that each respective node makes a determination of whether to take over one or more transactions that are assigned to the overburdened node. In one embodiment, each node within the set of nodes, in addition to executing the uniform basic set of algorithms, optionally also executes local algorithms to estimate viability of lending computing resources based on underlying variations in load levels or other conditions at each node. Thus, these additional or supplemental local algorithms may vary between nodes, whereas in contrast the uniform basic set of algorithms remains the same between each member of the set of nodes.

In one embodiment, a catastrophic failure triggers a remaining set of nodes of the computing cluster to each evaluate, based on an analysis of a respective current resource consumption level, whether to take ownership of at least one microservice transaction that previously belonged to the overburdened node. In one embodiment, the respective current resource consumption level refers to at least one of available CPU cycles or runtime memory (e.g., available RAM). Additionally, or alternatively, the respective current resource consumption may refer to any other suitable computing resource that one or more nodes of the computing cluster utilizes in order to partially or entirely complete a corresponding microservice transaction.

In one embodiment, the overburdened node creates an index of specific microservice transactions with which the overburdened node seeks assistance from another node. Moreover, in further embodiments, the helper node takes over a microservice transaction from the overburdened node based on an analysis of the index of specific microservice transactions.

Figure 6:
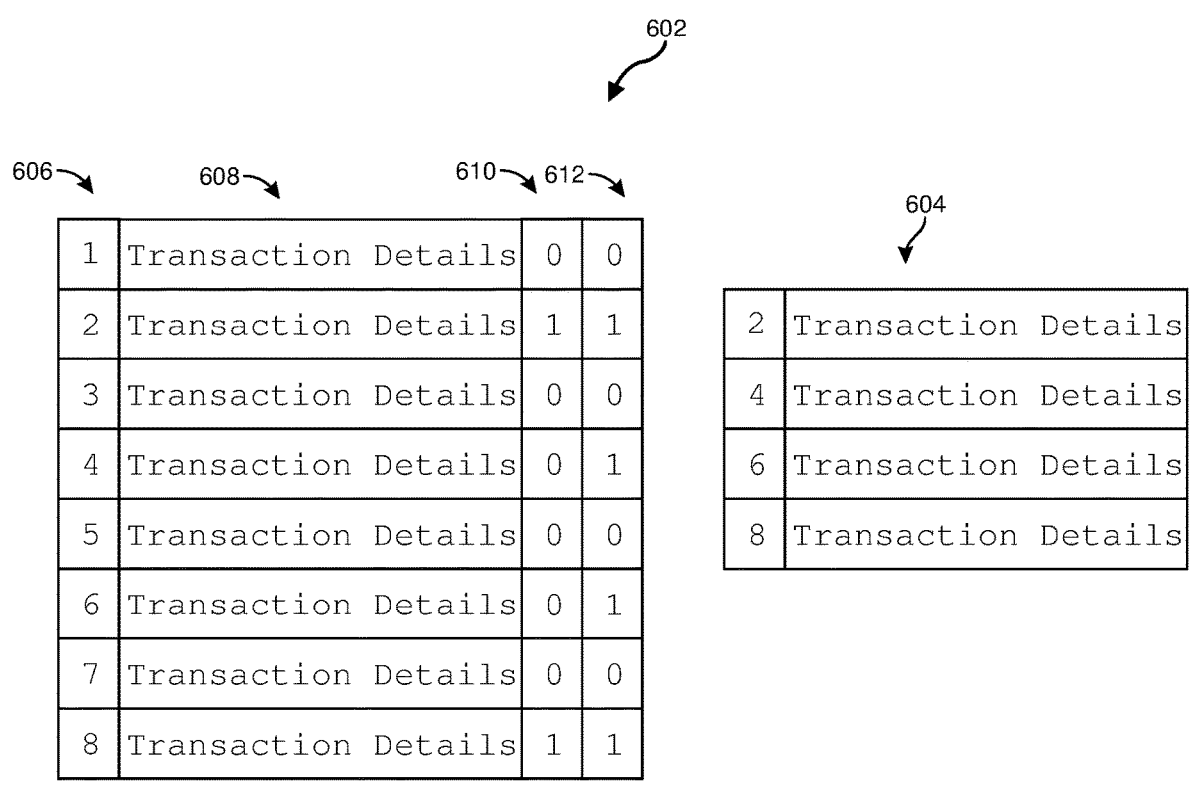
FIG. 6 is an index of microservice transactions.

FIG. 6 shows an example of such an index 602. As further shown in this figure, index 602 may include a left-hand most column 606, which may index by integer or other identifier a corresponding list of transactions that are currently held by, or assigned to, a particular node of the computing cluster. Additionally, index 602 may also include a column 608, which may further specify transaction details for the corresponding microservice transaction identified by the index of column 606. Although this figure uses the phrase "transaction details" for simplicity, the index may further specify a microservice context for each respective transaction. The microservice context may include service specific parameters. Such service specific parameters may include a delay tolerance, a minimum bandwidth of resource consumption, and/or an indication of whether encryption is mandatory. Each candidate helper node may take into account the nature of a respective transaction, such as delay tolerance, bandwidth utilization, a requirement for encryption or not, etc., to evaluate if the candidate helper node is a match or good fit to take over ownership.

Returning to FIG. 6, a column 610 may further specify whether another node of the computing cluster has already taken over the corresponding transaction. Thus, in this figure, the flag of "1" for transactions at the index numbers 2 and 8 indicates that at least one other node of the computing cluster has already taken over these transactions. In contrast, the use of "0" for the remaining transactions at this column indicates that no other node of the computing cluster has yet taken over these transactions. Additionally, index 602 may also include a column 612 that further specifies whether the particular node is requesting for a helper node to take over the respective transaction. Thus, this figure further shows how the overburdened node has determined to request assistance from another node for the transactions index at numbers 2, 4, 6, and 8, while not requesting assistance for the remaining transactions listed within the index. Moreover, the figure also illustrates how another index 604 may be generated, which lists only those transactions from index 602 for which the overburdened node is requesting assistance.

In one embodiment, the overburdened node recovers from a catastrophic failure and then synchronizes and resumes specific microservice transactions on the index that have not been previously claimed by other nodes within the computing cluster. Thus, in the example of FIG. 6, the recovered node may reference column 610 to ascertain which transactions have already been taken over by one or more helper nodes within the remaining set of nodes within the computing cluster. In this example, the transactions that have not already been taken over include those with the index number of 1, 3, 4, 5, 6, and 7. Accordingly, upon successfully recovering from a catastrophic failure, the previously overburdened node may restart synchronization procedures to further completion of these respective transactions.

In one embodiment, all of the specific microservice transactions held by the overburdened node are placed on an index of specific microservice transactions with which the overburdened node seeks assistance from another node due to a determination that the overburdened node has experienced a catastrophic failure. Moreover, as further discussed above in the context of FIG. 7, a determination may be made that the overburdened node has experienced a catastrophic failure in a scenario where the overburdened node has failed to transmit one or more periodic or expected heartbeat messages. Thus, in such a scenario, all of the values in column 612 may be set to "1" or "yes" to indicate that the overburdened node is presumably seeking assistance with all of its transactions in the event of a catastrophic failure.

At step 306, one or more of the systems described herein may copy data for the specific microservice transaction from a portion of a central data store that is reserved for the overburdened node to another data store that is reserved for the helper node. For example, copying module 108 may, as part of computing device 202 in FIG. 2, copy data for the specific microservice transaction from a portion of a central data store that is reserved for the overburdened node to another data store that is reserved for the helper node. As used herein, the term "central data store" may refer to a centralized data store that provides storage for multiple nodes of the computing cluster, as discussed further below.

In some examples, the central data store may satisfy a preestablished definition or protocol for high availability. For example, a system may satisfy a standard for high availability by ensuring an agreed level of operational performance, such as uptime, higher than a predefined threshold. High availability may be based on one or more of the following features: elimination of single points of failure, reliable crossover, and/or detection of failures as they occur. High availability may be defined as satisfying a threshold percentage of uptime over a period of time, such as a year. Such standards may include any one of the individual "nines" standards from 90% uptime ("one nine") to 99.9999999% uptime ("nine nines"). High availability may also be defined in terms of the threshold along an alternative metric of mean time between failures (MTBF). Similarly, high availability may be defined in terms of an estimated time of repair, recovery time objective, a mean time to recovery, and/or a service level agreement, which may formalize an organization's availability objectives and requirements.

Copying module 108 may perform step 306 in a variety of ways. Generally speaking, copying module 108 may perform step 306 by referencing data that is stored within the central data store. The central data store may hold all transactions from a set of nodes or all nodes of the computing cluster. FIG. 5 shows a diagram of an illustrative example of central data store 410. This figure further shows four sets of four columns, where the four columns are stacked upon each other within each set. These sets include a set 502, a set 504, a set 506, and a set 508, which may correspond to node 402, node 404, node 406, and node 408 of FIGS. 4 and 7. Each of the columns within each of the sets corresponds to a "slice" that stores some or all of the transaction data for the corresponding node within the computing cluster. The fact that the columns are shown as stacked upon each other further illustrates how each slice of data may be replicated. The high replication of data may achieve high availability according to a predefined metric, as outlined above, due to the fact that replication provides access to redundant copies of the data within additional slices even after other ones of the slices have failed or experienced a performance problem. For simplicity, this figure illustrates each of the slices as a respective stack of hardware storage units within a storage rack for the computing cluster, but in other examples, each of the slices may correspond to software or virtualized units, or to RAID or striped data storage configurations, rather than directly physical storage units within a storage rack, as understood by those having skill in the art.

In one embodiment, each node within a set of nodes of the computing cluster synchronizes or deposits its microservice transactions between a respective local storage and the central data store. Thus, in the examples of FIGS. 4, 5, and 7, each of the four nodes within the computing cluster may synchronize or deposit its own microservice transactions between its own local storage and high availability central data store 410. Accordingly, synchronized copies of the same data may be located both in the respective local storage and the central data store.

In one embodiment, the central data store is configured such that each node within a set of nodes has its own allocation such that a synchronization procedure for synchronizing input/output data for one node does not disturb input/output data or operations for any other nodes within the set of nodes. Thus, returning to the example of FIG. 5, each of the four sets of slices shown in this figure may be allocated to, or reserved for, a respective member node of the computing cluster. Accordingly, when input/output data is written to, or read from, the central data store, the corresponding input/output operations will only be directed to, and only place a burden on, the respective set for the target member node of the computing cluster. For example, an input/output operation that is directed to node 402, which corresponds to set 502, will only be directed to, and place a burden on, the replicated slices within set 502. Moreover, the same input/output operation will thereby not be directed to, and will not place a burden on, any of the slices within the remaining sets, including set 504, set 506, and set 508.

In one embodiment, the central data store creates an efficiency advantage for synchronization procedures such that a node may synchronize input/output data with the central data store rather than transmitting multiple copies of the input/output data to multiple other nodes. Returning to the example of FIG. 4, high availability central data store 410 may create an efficiency advantage for synchronization procedures, including procedures for synchronizing data between the four nodes of the computing cluster and the central data store, due to the fact that these synchronization procedures only synchronize data between high availability central data store 410 and a respective member node using a separate channel, such as high-bandwidth data transfer channel 422 rather than group communication channel 420, as discussed in more detail above.

Generally speaking, step 306 may be performed according to a greedy approach or design in the sense that the determination of whether to take over a transaction is based in part on a goal of maximizing overall computing cluster utilization. For example, even in a scenario where a node aggressively volunteers its computing bandwidth and then subsequently overloads this computing bandwidth, that node can seek assistance from other nodes immediately. In this manner, the load may be consistently propagated throughout the computing cluster. Moreover, this greedy approach may consume as much of the available computing resources as possible from all nodes.

Moreover, step 306 may also be performed in a manner that renders the member nodes of the computing cluster to be substantially or entirely homogeneous. Thus, each of the member nodes execute the same uniform basic set of algorithms, as further discussed above. In other words, any available node can serve as a backup for any other node to offer contained microservices and vice versa. Such an approach may be referred to as "active-active" due to the fact that each homogeneous member node of the computing cluster may perform both direct operations for completing transactions and/or backup operations for supporting other nodes of the computing cluster that are overburdened.

In some examples, copying module 108 may optionally delete the respective transaction that was taken over from the overburdened node after the helper node has successfully transferred the transaction to its own data store. Thus, copying module 108 may instruct the deletion of the respective transaction from the portion of the central data store that is reserved for the overburdened node and/or instruct the deletion of the corresponding synchronized data within the local data storage of the overburdened node.

In some examples, copying module 108 may facilitate the taking over of a transaction in part by marking the transaction in a single atomic operation. In further examples, the single atomic operation may correspond to a compare-and-swap operation, which may refer to an operation that first compares a current value to determine whether another node has already taken ownership and then, if not, furthermore sets the value to mark that it now has taken control of that transaction. The atomic operation may ensure mutually exclusive access to the transaction's ownership state such that only one node can be setting the value at any given time and thereby prevents multiple claims to the same transaction. The atomic operation to mark ownership may be performed in an extremely efficient manner.

At step 308, one or more of the systems described herein may complete, as part of the helper node, the specific microservice transaction by referencing the copied data for the specific microservice transaction in the data store that is reserved for the helper node. For example, completion module 110 may complete, as part of the helper node, microservice transaction 122 by referencing data 124 for microservice transaction 122 in the data store that is reserved for the helper node.

Completion module 110 may perform step 308 in a variety of ways. Generally speaking, completion module 110 may perform step 308 by referencing the copy of the data that was transferred from the portion of the central data store that was reserved for the overburdened node. The copy of the data may be transferred from this reserved portion to another data store that is specific to the helper node. This additional data store may correspond to a local data store that is located within the helper node. As with the overburdened node, the helper node may also synchronize the copied data between its local storage and its own portion of the central data store (e.g., one of set 502, set 504, set 506, and set 508 as discussed above in connection with FIG. 5).

Figure 8:
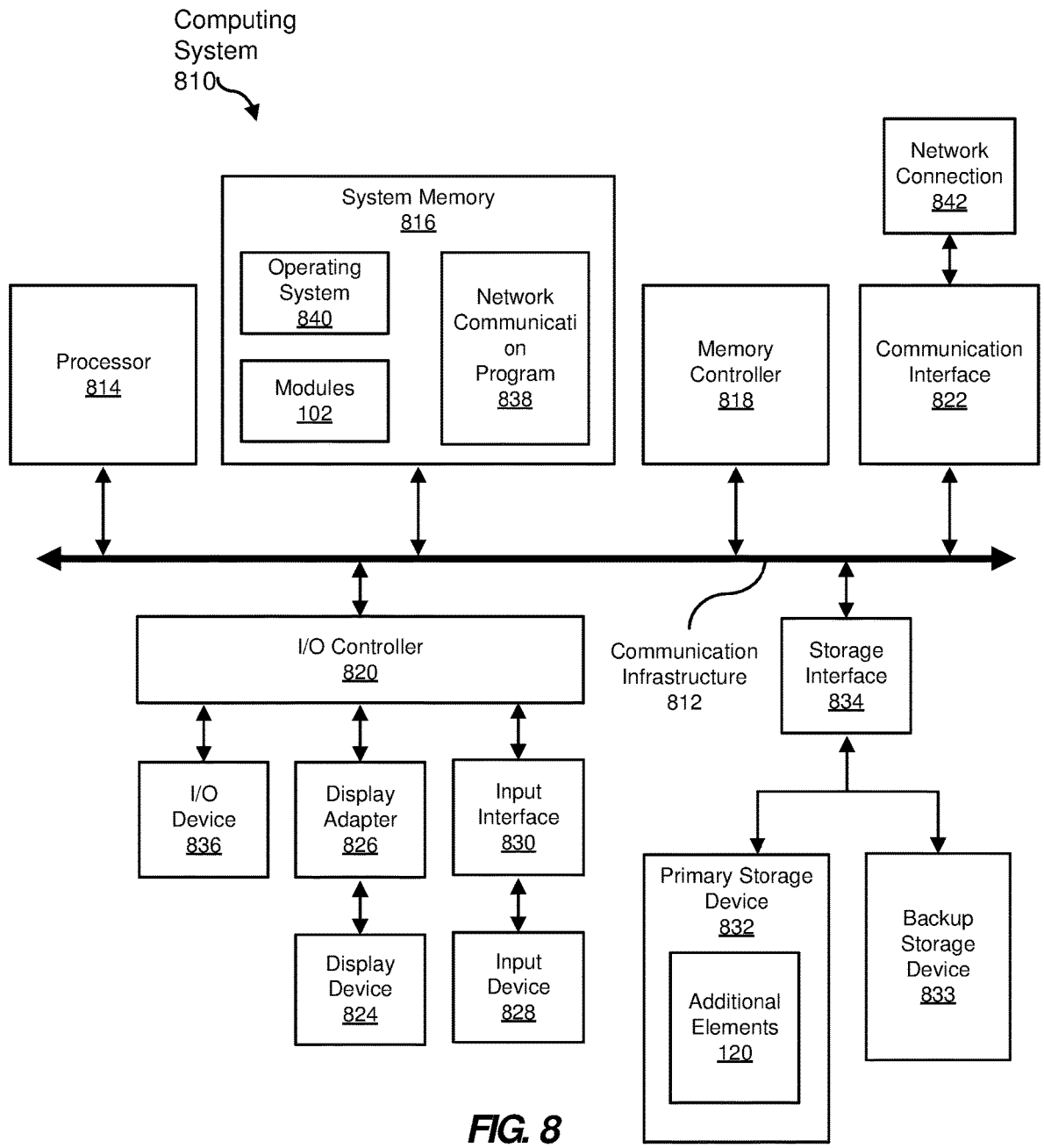
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
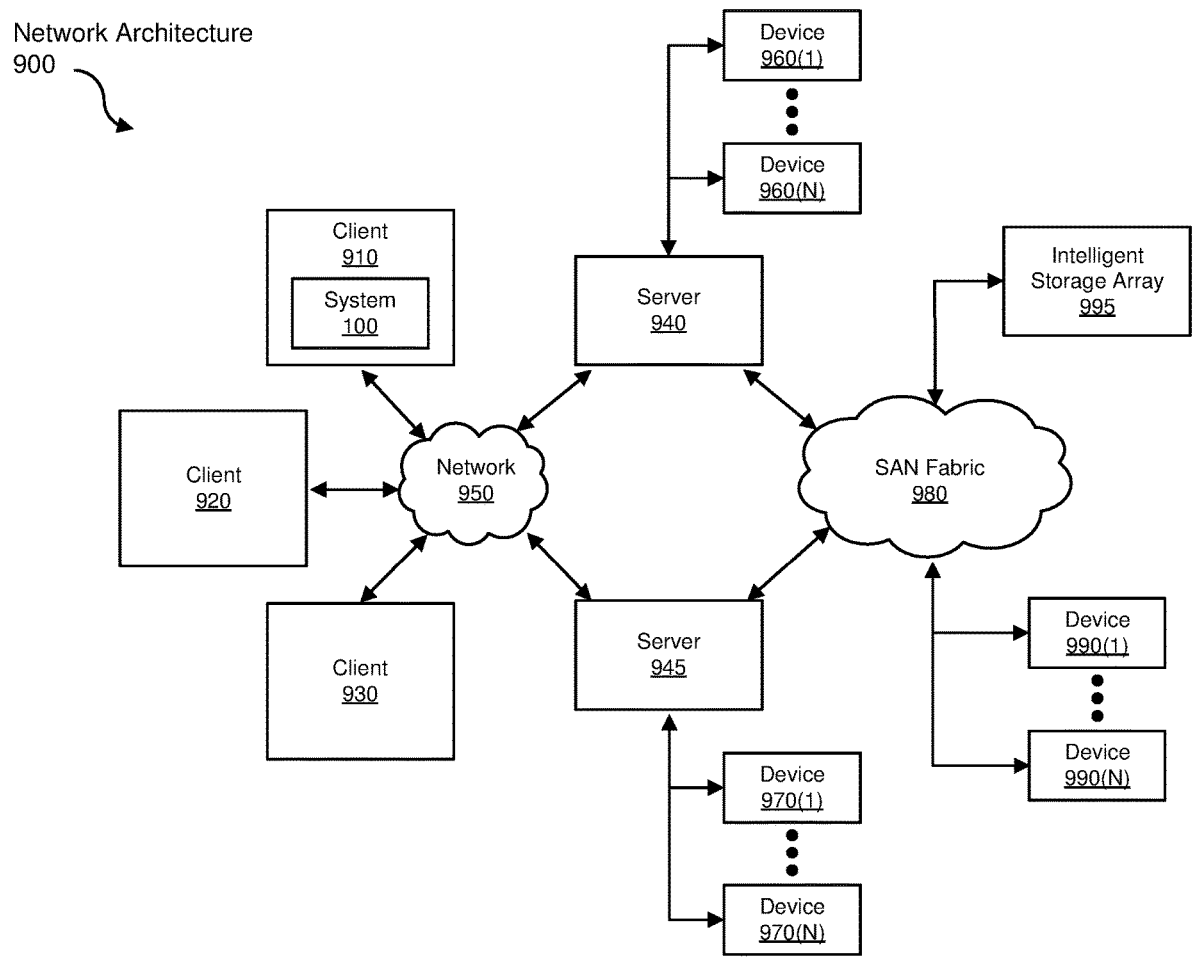
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for performing load balancing and distributed high-availability.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for performing load balancing and distributed high-availability, at least a portion of the method being performed by a computing device comprising at least one processor, the method comprising:
   detecting through a group communication channel that links all nodes of a computing cluster that an overburdened node of the computing cluster has fallen below a predefined performance level;
   determining to transfer a specific microservice transaction from the overburdened node to a helper node in the computing cluster;
   copying data for the specific microservice transaction from a portion of a central data store that is reserved for the overburdened node to another data store that is reserved for the helper node; and
   completing, by the helper node, the specific microservice transaction by referencing the copied data for the specific microservice transaction in the data store that is reserved for the helper node.

2. The computer-implemented method of claim 1, wherein the central data store holds all transactions from all nodes of the computing cluster.

3. The computer-implemented method of claim 1, wherein the central data store comprises a high-availability central data store that satisfies a predefined high-availability threshold according to a metric that measures availability of the central data store.

4. The computer-implemented method of claim 1, wherein each node within a set of nodes of the computing cluster synchronizes or deposits its microservice transactions between a respective local storage and the central data store.

5. The computer-implemented method of claim 1, wherein the central data store is configured such that each node within a set of nodes has its own allocation such that a synchronization procedure for synchronizing input/output data for one node does not disturb input/output data for any other nodes within the set of nodes.

6. The computer-implemented method of claim 1, wherein the central data store creates an efficiency advantage for synchronization procedures such that a node may synchronize input/output data with the central data store rather than transmitting multiple copies of the input/output data to multiple other nodes.

7. The computer-implemented method of claim 1, wherein the group communication channel comprises a multicast channel.

8. The computer-implemented method of claim 1, wherein detecting through the group communication channel that links all nodes of the computing cluster that the overburdened node of the computing cluster has fallen below the predefined performance level comprises detecting that the overburdened node has failed to transmit a number of periodic heartbeat messages.

9. The computer-implemented method of claim 8, wherein detecting that the overburdened node has failed to transmit the number of periodic heartbeat messages comprises triggering a determination that the overburdened node has experienced a catastrophic failure.

10. The computer-implemented method of claim 9, wherein the catastrophic failure triggers a remaining set of nodes of the computing cluster to each evaluate, based on an analysis of a respective current resource consumption level, whether to take ownership of at least one microservice transaction that previously belonged to the overburdened node.

11. The computer-implemented method of claim 10, wherein the respective current resource consumption level refers to at least one of available CPU cycles or runtime memory.

12. The computer-implemented method of claim 1, wherein detecting through the group communication channel that links all nodes of the computing cluster that the overburdened node of the computing cluster has fallen below the predefined performance level comprises receiving a help message that indicates that the overburdened node is seeking assistance from another node.

13. The computer-implemented method of claim 12, wherein the overburdened node creates an index of specific microservice transactions with which the overburdened node seeks assistance from another node.

14. The computer-implemented method of claim 13, wherein another node takes over a microservice transaction from the overburdened node based on an analysis of the index of specific microservice transactions.

15. The computer-implemented method of claim 1, wherein all of the specific microservice transactions held by the overburdened node are placed on an index of specific microservice transactions with which the overburdened node seeks assistance from another node due to a determination that the overburdened node has experienced a catastrophic failure.

16. The computer-implemented method of claim 15, wherein the overburdened node recovers from the catastrophic failure and then synchronizes and resumes specific microservice transactions on the index that have not been previously claimed by other nodes within the computing cluster.

17. The computer-implemented method of claim 1, wherein each node within a set of nodes in the computing cluster executes a uniform basic set of algorithms to compute viability for volunteering its computing resources to assist another node.

18. The computer-implemented method of claim 17, wherein each node within the set of nodes, in addition to executing the uniform basic set of algorithms, furthermore executes local algorithms to estimate viability of lending computing resources based on underlying variations in load levels or other conditions at each node.

19. A system for performing load balancing and distributed high-availability, the system comprising:
  a detection module, stored in memory, that detects through a group communication channel that links all nodes of a computing cluster that an overburdened node of the computing cluster has fallen below a predefined performance level;
  a determination module, stored in memory, that determines to transfer a specific microservice transaction from the overburdened node to a helper node in the computing cluster;
  a copying module, stored in memory, that copies data for the specific microservice transaction from a portion of a central data store that is reserved for the overburdened node to another data store that is reserved for the helper node;
  a completion module, stored in memory, that completes, as part of the helper node, the specific microservice transaction by referencing the copied data for the specific microservice transaction in the data store that is reserved for the helper node; and
  at least one physical processor configured to execute the detection module, the determination module, the copying module, and the completion module.

20. A non-transitory computer-readable medium comprising one or more computer-readable instructions that, when executed by at least one processor of a computing device, cause the computing device to:
  detect through a group communication channel that links all nodes of a computing cluster that an overburdened node of the computing cluster has fallen below a predefined performance level;
  determine to transfer a specific microservice transaction from the overburdened node to a helper node in the computing cluster;
  copy data for the specific microservice transaction from a portion of a central data store that is reserved for the overburdened node to another data store that is reserved for the helper node; and
  complete, by the helper node, the specific microservice transaction by referencing the copied data for the specific microservice transaction in the data store that is reserved for the helper node.

\* \* \* \* \*

UNITED STATES PATENT AND TRADEMARK OFFICE
CERTIFICATE OF CORRECTION

PATENT NO. : 11,188,393 B1
APPLICATION NO. : 17/190219
DATED : November 30, 2021
INVENTOR(S) : Qing Li It is certified that error appears in the above-identified patent and that said Letters Patent is hereby corrected as shown below:

In the Claims

In Column 20, Line 67, in Claim 1, delete "node." and insert -- node; wherein: all of the specific microservice transactions held by the overburdened node are placed on an index of specific microservice transactions with which the overburdened node seeks assistance from another node due to a determination that the overburdened node has experienced a catastrophic failure; or the overburdened node creates an index of specific microservice transactions with which the overburdened node seeks assistance from another node and the helper node takes over a microservice transaction from the overburdened node based on an analysis of the index of specific microservice transactions. --.

In Column 21, Lines 58-59, in Claim 12, delete "message that indicates that the overburdened node is seeking assistance from another node." and insert -- message. --.

In Column 21, Lines 61-63, in Claim 13, delete "the overburdened node creates an index of specific microservice transactions with which the overburdened node seeks assistance from another node." and insert -- the help message indicates that the overburdened node is seeking assistance. --.

In Column 21, Lines 65-67, in Claim 14, delete "another node takes over a microservice transaction from the overburdened node based on an analysis of the index of specific microservice transactions." and insert -- the help message indicates that the overburdened node is seeking assistance from another node. --.

In Column 22, Lines 2-7, in Claim 15, delete "all of the specific microservice transactions held by the overburdened node are placed on an index of specific microservice transactions with which the overburdened node seeks assistance from another node due to a determination that the overburdened node has experienced a catastrophic failure." and insert -- the overburdened node recovers from the catastrophic failure. --.

In Column 22, Lines 9-10, in Claim 16, delete "the overburdened node recovers from the catastrophic failure and then" and insert -- the overburdened node --.

Signed and Sealed this
Twentieth Day of September, 2022

*Katherine Kelly Vidal*
Katherine Kelly Vidal
*Director of the United States Patent and Trademark Office*

CERTIFICATE OF CORRECTION (continued)
U.S. Pat. No. 11,188,393 B1

In Column 22, Line 50, in Claim 19, delete "module." and insert -- module; wherein the system is configured such that: all of the specific microservice transactions held by the overburdened node are placed on an index of specific microservice transactions with which the overburdened node seeks assistance from another node due to a determination that the overburdened node has experienced a catastrophic failure; or the overburdened node creates an index of specific microservice transactions with which the overburdened node seeks assistance from another node and the helper node takes over a microservice transaction from the overburdened node based on an analysis of the index of specific microservice transactions. --.

In Column 23, Line 2, in Claim 20, delete "node." and insert -- node; wherein the instructions further instruct that: all of the specific microservice transactions held by the overburdened node are placed on an index of specific microservice transactions with which the overburdened node seeks assistance from another node due to a determination that the overburdened node has experienced a catastrophic failure; or the overburdened node creates an index of specific microservice transactions with which the overburdened node seeks assistance from another node and the helper node takes over a microservice transaction from the overburdened node based on an analysis of the index of specific microservice transactions. --.